United States Patent [19]
Ninomiya et al.

[11] Patent Number: 4,656,401
[45] Date of Patent: Apr. 7, 1987

[54] LOAD DRIVE APPARATUS

[75] Inventors: Hisakazu Ninomiya; Hiroyuki Tomita, both of Funabashi; Jyun Mochizuki, Yokohama; Kazuyuki Nakagawa, Itikawa, all of Japan

[73] Assignees: Hitachi, Ltd.; Hitachi Keiyo Engineering Co., Ltd., both of Japan

[21] Appl. No.: 707,500

[22] Filed: Mar. 4, 1985

[30] Foreign Application Priority Data

Mar. 5, 1984 [JP] Japan ................... 59-40333

[51] Int. Cl.$^4$ ............................ H02P 7/28
[52] U.S. Cl. .................. 318/329; 318/779; 318/798; 318/806
[58] Field of Search ............ 318/778, 779, 326, 327, 318/328, 314, 318, 798, 806, 329

[56] References Cited

U.S. PATENT DOCUMENTS

| 3,349,308 | 10/1967 | Strand | 318/314 |
| 4,080,555 | 3/1978 | Kawada et al. | 318/314 |
| 4,081,728 | 3/1978 | Nikami et al. | 318/318 |
| 4,271,382 | 6/1981 | Maeda et al. | 318/314 |
| 4,278,925 | 7/1981 | Minakuchi | 318/314 |
| 4,516,060 | 5/1985 | Guzik et al. | 318/327 |
| 4,516,065 | 5/1985 | Niomiya et al. | 318/811 |

Primary Examiner—David Smith, Jr.
Attorney, Agent, or Firm—Antonelli, Terry & Wands

[57] ABSTRACT

A system consisting of a motor that drives a load, an analog signal generator that outputs an analog signal which increases as the motor is accelerated, a speed commander that determines a motor speed and commands the motor to operate at the determined speed, and an energizing circuit that receives signal representing difference between the output from the speed commander and the output from the analog signal generator and that energizes the motor so as to operate at the speed in accordance with the signal for the difference is provided with a pulse generator that outputs a pulse corresponding to the current motor speed and with a control circuit that controls the signal for the difference in such way that when the motor is operated at a low speed at which the interval of pulses output from the pulse generator becomes long the signals for the difference issued during a pulse interval sequentially increase.

With the aforementioned structure of the systen, during extremely low speed motor operation during which the generated pulse interval becomes long the energizing circuit acts in the direction of increasing motor speed in the course of a pulse interval, thereby enabling the system itself to constitute a load drive apparatus having superior operating performance characteristics without any anxiety about abnnormal reduction of motor speed or motor stop in the worst case.

13 Claims, 13 Drawing Figures

LOAD DRIVE APPARATUS

BACKGROUND OF THE INVENTION

1. Field of the Invention

The present invention relates to a load drive apparatus to drive a load by a speed-controllable motor.

2. Description of the Prior Art

A recent demand is to establish a technique of smoothly driving a load at extremely low speed. The prior art to meet such demand is in general to use a transmission apparatus which is able to greatly reduce motor speed. However, the use of the transmission apparatus not only makes the entire load drive apparatus considerably large, but also lowers operating efficiency.

To find a solution for the above mentioned problem, various attempts have been made to operate the motor directly without using a transmission apparatus. One example is provided by a Japanese Pat. No. S58-9596 disclosed in the official gazette.

Now, in many cases for motor speed control, the operating speed of the motor is detected and used as a feedback signal. A means of detecting this motor speed is of two types, one to output analog signals and the other to output digital signals.

As a means outputting digital signals is less affected by temperature variation than that of outputting analog signals, the use of digital signal for this purpose is becoming the main stream in this field.

However, if a device that outputs a digital signal is used as a speed detecting means for the motor in operation at an extremly low speed of less than 1 [r.p.m], as an example, the interval of pulses output from this speed detecting device, becomes considerably large, thus being unable to know the actual motor speed during the pulse interval. To fill this blank, the preceding speed information obtained is held with the assumption that the motor is currently in operation at this speed to drive the motor.

Therefore, if the motor speed information obtained indicates greater than the actual speed of revolution, the motor speed is reduced less than a specified speed of revolution or the motor stops in the worst case, thus eventually failing in smooth motor operation.

SUMMARY OF THE INVENTION

The present invention is prepared in response to the aforementioned situation, and it is an object of the invention to provide a load drive apparatus having superior operating characteristics that are played in extremely low speed motor operation.

That is, a system consisting of a motor that drives a load, an analog signal generator that outputs an analog signal which increases as the motor is accelerated, a speed commander that determines a motor speed and commands the motor to operate at the determined speed, and an energizing circuit that receives signal representing a difference between the output from the speed commander and the output from the analog signal generator and that energizes the motor so as to operate at the speed in accordance with the signal for the difference is provided with a pulse generator that outputs a pulse corresponding to the current motor speed and with a control circuit that controls the signal for the difference in such way that when the motor is operated at a low speed at which the interval of pulses output from the pulse generator becomes long the signals for the difference issued during a pulse interval sequentially increase.

With the aforementioned structure of the system, during extremely low speed motor operation during which the generated pulse interval becomes long the energizing circuit acts in the direction of increasing motor speed in the course of a pulse interval, thereby enabling the system itself to constitute a load drive apparatus having superior operating performance characteristics without any anxiety about abnormal reduction of motor speed or stopping of the motor in the worst case.

The control circuit can be constituted so that when it receives an output from the analog signal generating section, it sequentially reduces this output throughout a period of time from outputting a pulse from the pulse generator to outputting the next pulse tnerefrom and as a result it can enhance the signal for the difference between two inputs to the energizing circuit.

Further, the control circuit can also be constituted so that when it receives an output from the speed commanding section, it can sequentially enhance this output throughout a period of time from outputting a pulse from the pulse generator to outputting the next pulse therefrom, and as a result it can enhance the signal for the difference between two inputs to the energizing circuit.

Furthermore, the control circuit can be constituted so that it can directly act on the speed commanding section and can sequentially enhance an output from the speed commanding section throughout a period of time from outputting a pulse from the pulse generator to outputting the immediately next pulse therefrom, and as a result it can enhance the signal for the difference between two inputs.

BRIEF DESCRIPTION OF THE DRAWINGS

FIGS. 11 and 12 10 and 11 show the relationship between the input and the output shown in FIG. 9.

DESCRIPTION OF THE PREFERRED EMBODIMENT

The following describes an embodiment of the present invention shown in FIGS. 1 through 6.

Figure 1:
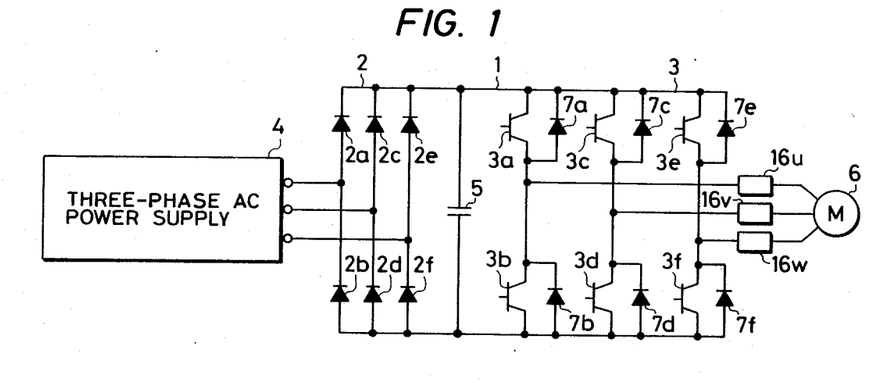
FIG. 1 is a circuit showing an energizing example according to the present invention.

In FIG. 1, a PWM inverter 1 as the energizing circuit is composed of power rectifier 2 that converts AC power into DC power and power inverter 3 that converts DC power into AC power. Power rectifier 2 is formed of 6 diodes 2a through 2f connected in a three-phase bridge whose input terminals are connected to a three-phase AC power source 4 and whose output terminals are connected to smoothing rectifier 5. Power inverter 3 consists of 6 switching elements 3a through 3f connected in a three-phase bridge whose input terminals being connected to both smoothing rectifier 5 and the output terminals of power rectifier 2 and whose output terminals are connected to a three-phase induction motor 6 which is used to drive a load not shown in FIG. 1. As main switching elements 3a through 3f, power transisters are used or gate turn off thyrister can also be used instead. Main switching elements 3a through 3f are connected across flywheel diodes 7a through 7f, respectively.

Figure 2:
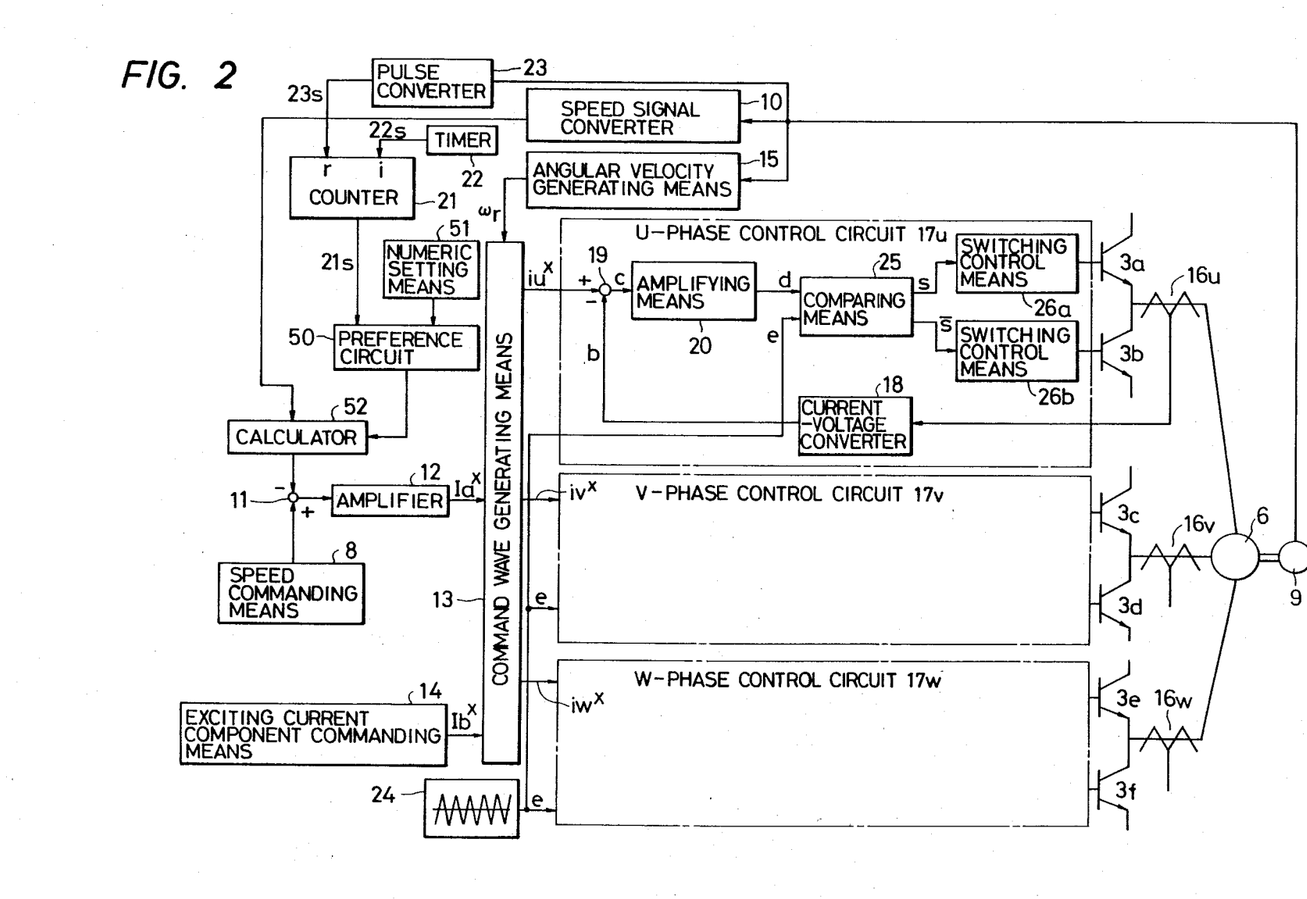
FIG. 2 is a block diagram of an embodiment of the load drive apparatus according to the present invention.

In FIG. 2, reference numeral 8 represents the speed commanding section for setting a desired operating speed for motor 6, and if an analog signal is used to set the desired operating speed for the motor a rotary switch is used, and if a digital signal is used for the same purpose a digital switch, etc. may be used.

Reference numeral 9 represents the speed detector which is connected to the shaft of motor 6 and which outputs a train of single-phase pulses with the frequency in proportion to the speed of revolution of the shaft of motor 6. Reference numeral 10 represents the speed signal converter which receives the output from speed detector 9 and which outputs the signal representing the direction of rotation of motor 6 and the analog signal whose magnitude is in proportion to the pulse frequency. That is, the analog signal generating means is constituted by speed detector 9 and speed signal converter 10.

Reference numeral 21 represents a counter, which is designed so that every time a signal enters from timer 22, the count can be incremented by one and the counter can be reset when it receives a signal from pulse converter 23.

Pulse converter 23 is designed so that when it receives single-phase pulses from the speed detector and respective signals rise and fall it can output respective pulses. That is, the pulse generator consists of speed detector 9 and pulse converter 23. Reference numeral 50 represents a size preference circuit which is designed to compare the output from numeric setting section 51 and the value recorded on counter 21 and to output the greater output. The count number on numeric setting section 51 is set to 1. Reference numeral 52 represents a caculator which is designed to divide the output from speed signal converter 10 by the size preference circuit 50. Or, in this preferred embodiment, the control circuit is composed of counter 21, timer 22, pulse converter 23, preference circuit 50, numeric setting section 51, and calculator 52.

Subtract circuit 11 is designed to obtain the difference between the output from speed commanding section 8 and the output from calculator 52 (or s:gnal for the difference;. Amplifier 12 is designed to receive the output from subtract circuit 11, to amplify the output to an appropriate magnitude, and to output Ia*.

Command wave generating section 13 receives output $I_a^*$ from amplifier 12, command $I_b^*$ from exciting current component command $I_b^*$, and rotational angular velocity signal $\omega_r$, executes the following calculations, and then outputs each phase command wave signal $i_u^*$, $i_v^*$, and $i_w^*$.

$$i_u^* = I^* \sin(\omega_1 t + \theta) \quad (1)$$

$$i_v^* = I^* \sin\left(\omega_1 t - \frac{2}{3}\pi + \theta\right) \quad (2)$$

$$i_w^* = I^* \sin\left(\omega_1 t - \frac{4}{3}\pi + \theta\right) \quad (3)$$

$$\text{where } I^* = \sqrt{(I_a^*)^2 + (I_b^*)^2} \quad (4)$$

$$\theta = \tan^{-1}(I_a^*/I_b^*) \quad (5)$$

$$\omega_1 = r + s \quad (6)$$

$$\omega_s = K \frac{I_a^*}{\phi} = K \frac{I_a^*}{MI_b^*(1 + ST)} \quad (7)$$

K: Coefficient
$\phi$: Secondary interlinkage magnetic flux
M: Mutual inductance of motor 6
S: Laplace transform operator
T: Secondary time constant of motor 6

As the command wave generating section 13 is well-known as disclosed in U.S. Pat. No. 4,172,991 and the present invention does not consider that the concrete constitution of command wave generating section 13 is a major point of the present invention, the further description thereof is omitted.

Figure 3:
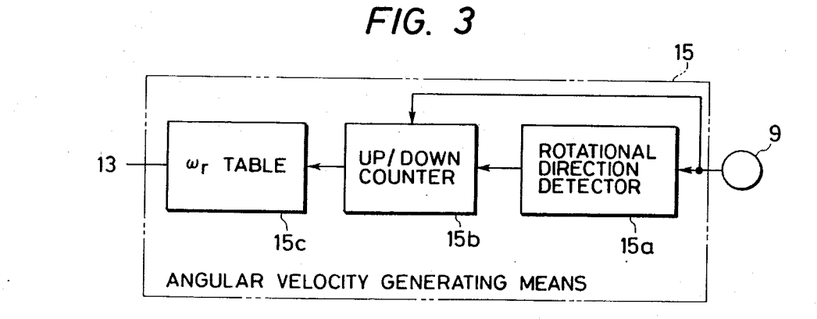
FIG. 3 is a block diagram showing a practical example of the rotational angular velocity generating means shown in FIG. 2.

Also, rotational angular velocity generating section 15 as shown in FIG. 3 consists of the rotational direction detector 15a that detects the rotational direction of motor 6 in phase order of two-phase pulses of speed detector 9, the up/down counter 15b that executes count up and down of pulses from speed detector 9 in accordance with the output from rotational direction detector 15a and the table 15c that outputs value $\omega_r$ of angular velocity signal in response to the output from this counter 15b.

Now, within the network from the output terminal of PWM inverter 1 to individual phase windings of motor 6 the current transformers 16u, 16v, and 16w are disposed.

The base signal that controls main switching elements 3a and 3b is designed to be produced by U-phase control circuit 17u when receiving command wave signal $i_u^*$ and the output from current transformer 16v.

Another base signal that controls main switching elements 3e and 3f is designed to be produced by W-phase control circuit 17w when receiving command wave signal $i_w^*$ and the output from current transformer 16w.

These individual phase control circuits 17u, 17v, and 17w are all constructed the same. Therefore, the description of these phase control circuits will be represented with U-phase control circuit 17u as follows. As command wave signal $i_u^*$ is expressed in voltage, the output from current transformer 16u, which is to be involved in calculation with command wave signal, is converted into voltage by current-voltage converter 18.

The embodiment is designed so that command wave signal $i_u^*$ and output b from converter 18 can be input to calculating section 19 according to the polarity shown in FIG. 2 and the calculating section 19 can output the signal c the difference between output $i_u^*$ from command generating section 13 and the output from converter 18, and then make design of the embodiment so that the output of this difference can be amplified to an appropriate magnitude by amplifying circuit 20, and let it be d.

The output d from amplifying circuit 20 and output e from carrier signal generating section 24 can be compared by compare circuit 25 and the output from amplifying section 20 can be modulated by carrier wave to output the width modulation pulse.

Figure 4:
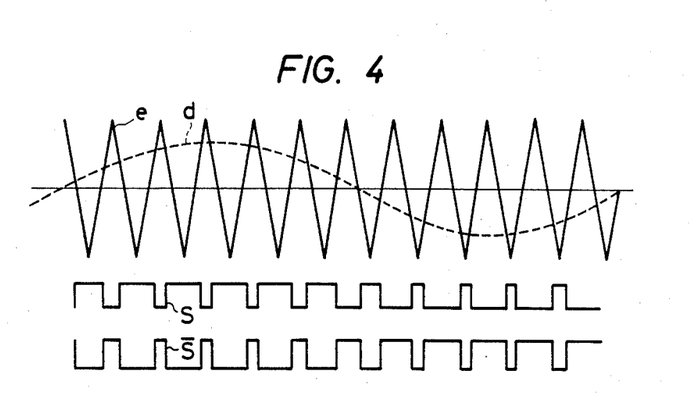
FIGS. 4 through 6 are timing diagrams that explain operations of the circuits shown in FIG. 2.

That is, compare circuit 25 acts so as to compare signals d and e and to generate both the signal S which is turned to "H" only when d>e as shown in FIG. 4 and which is turned to "L" only when d<e and the signal $\overline{S}$ which is obtained by inverting the polarity of signal S. Therefore, these signals S and $\overline{S}$ appearing at the output from compare circuit 25 are those obtained by converting signal d into PWM signal.

Switching elements 26a and 26b act so as to execute on/off operation of main switching elements 3a and 3b in accordance with PWM signals S and $\overline{S}$. As a result, main switching elements 3a and 3b are alternately switched to each other so that when one element is turned on the other is turned off, thus supplying induction motor 6 with current.

Therefore, according to this control apparatus, the on/off duty of main switching elements 3a and 3b varies with the error signal d between command wave signal $i_u{}^*$ and detected current value b at every instant, by which the feedback control acts in the direction that makes command wave signal $i_u{}^*$ coincide with detected current value b, thereby enabling the instantaneous value of load current to be controlled so as to be converged into command wave signal $i_u{}^*$.

Figure 5:
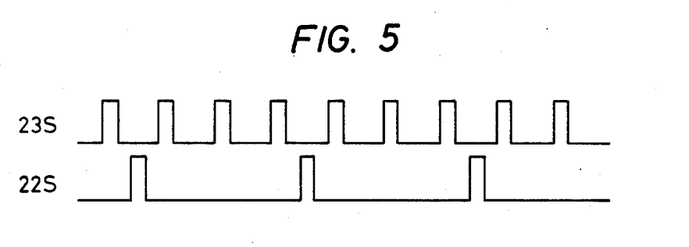

Now, if the speed of revolution of induction motor 6 is high, the relationship between output 22s from timer 22 and output 23s from pulse converter 23 is as shown in FIG. 5, and pulse converter 23 outputs many pulses in a pulse interval of the output signal from timer 22.

In this connection, counter 21 counts by 1 when timer 22 outputs a pulse, but it is immediately reset by the signal from pulse converter 23. Therefore, the output from size preference circuit 50 is 1 and can not be greater than 1. Therefore, calculator 52 outputs the output directly from speed signal converter 10 to the subtract circuit 11. Therefore, in this case, the control circuit does not apparently exert any action on the subtract circuit 11.

Figure 6:
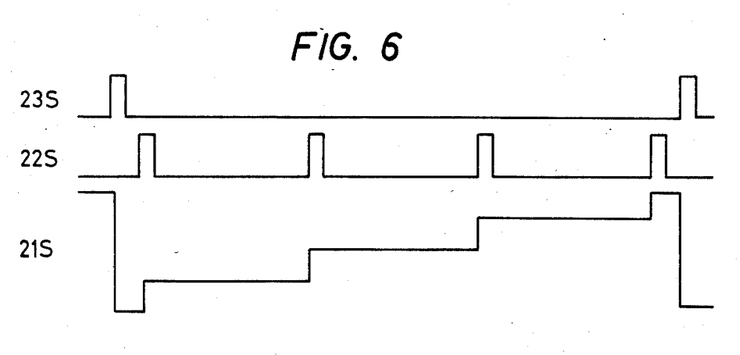

When the speed of revolution of motor 6 lowers, the interval of output pulse 23s from pulse converter 23 eventually becomes longer than the interval of output pulse 22s from timer 22 as shown in FIG. 6. As a result, the count by counter 21 increases one by one every time the signal is issued as is represented with reference numeral 21s representing the output from counter 21. This tendency continues until pulse converter 23 issues the next pulse. As a consequence, the output from size preference circuit 50 increases the same as shown by 21s. As in calculator 52 the output from speed signal converter 10 is divided by the output from preference circuit 50, the magnitude of the output from calculator 52 gradually decreases, while the magnitude of the output (or difference signal) from the subtract circuit 11 gradually increases so as to raise the speed of induction motor 6.

Moreover, the feedback value that acts on the subtract circuit 11 every time the signal is issued from pulse converter 23 is corrected to a value appropriate to the actual state. Therefore, no such state occurs that motor 6 comes to stop during low speed operation, but motor 6 can operate at extremely low speed.

Although the above description is provided for the function of the phase control circuit using an up-counter for counter 21, the use of a down-counter for counter 21 is also possible. If the down-counter is used, there is provided a multiplier for calculator 52, a preference circuit that provides priority on a small output for preference circuit 50, and set the initial value for down-counter 21.

Figure 7:
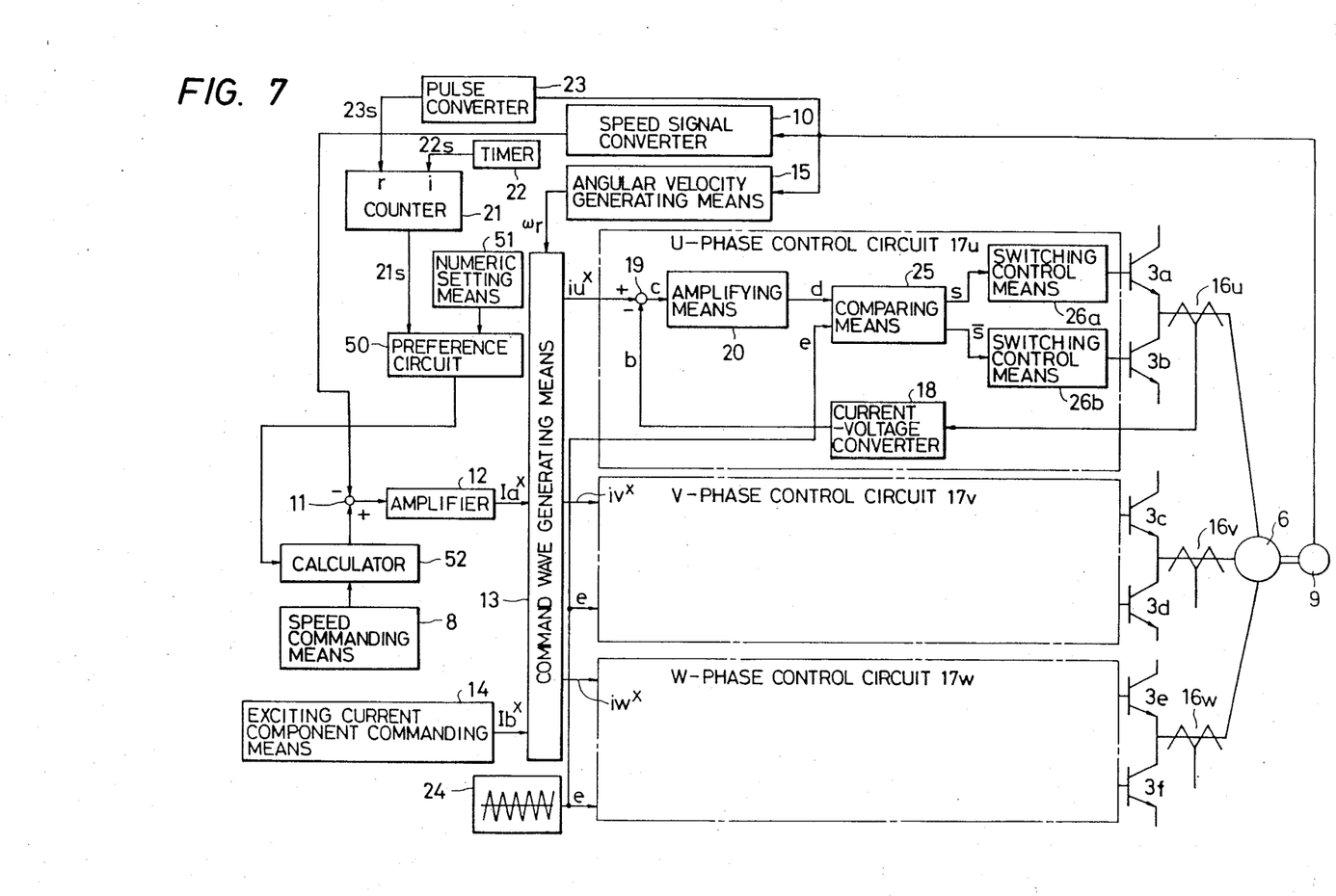
FIGS. 7, 8, 9 and 12 are block diagrams showing individually different embodiments of the load drive apparatus according to the present invention.

FIG. 7 is another embodiment of the present invention. In this embodiment, calculator 52 is provided between speed setting section 8 and subtract circuit 11. If an up-counter is used for counter 21 in this embodiment, preference circuit 50 is designed to select a greater one from the output of counter 21 and the output of numeric setting section 51 and to output it. It is preferred to set a considerably great value to numeric setting section 51 so as to slightly reduce the extent of the effect of the variation of the output from counter 21. Calculating circuit 52 is designed to have such multiplication function of multiplying the output from preference circuit 50 by the output from speed setting section 8.

In the embodiment shown in FIG. 7, a device that can carry out division may be used as calculator 52. In this case, a down-counter is used for counter 21, and the initial value of the down-counter is set to numeric setting section 51.

Figure 8:
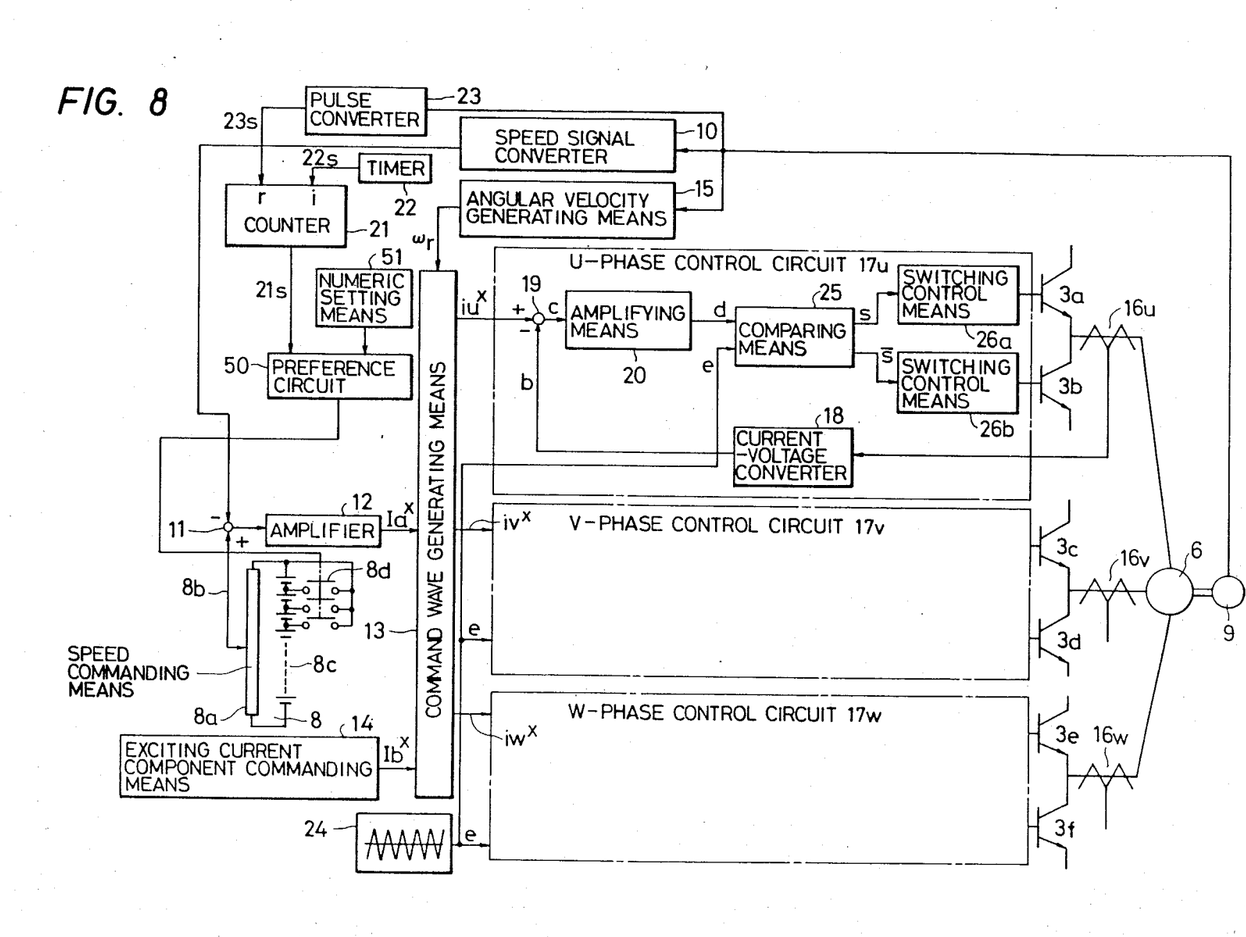

FIG. 8 is a further different embodiment of the present invention. This embodiment is not provided with calculator 52 shown in FIG. 7, but instead is designed to directly change the output from speed setting section 8 by the output from preference circuit 50. Or, speed setting section 8 consists of a group of contact points 8d that open and close in response to the output from preference circuit 50 in addition to the potentiometer consisting of resistor 8a, slider 8b, and DC power source 8C. This group of contact points acts so that the voltage applied to both terminals of resistor 8a gets high as the count by counter 21 advances.

Figure 9:
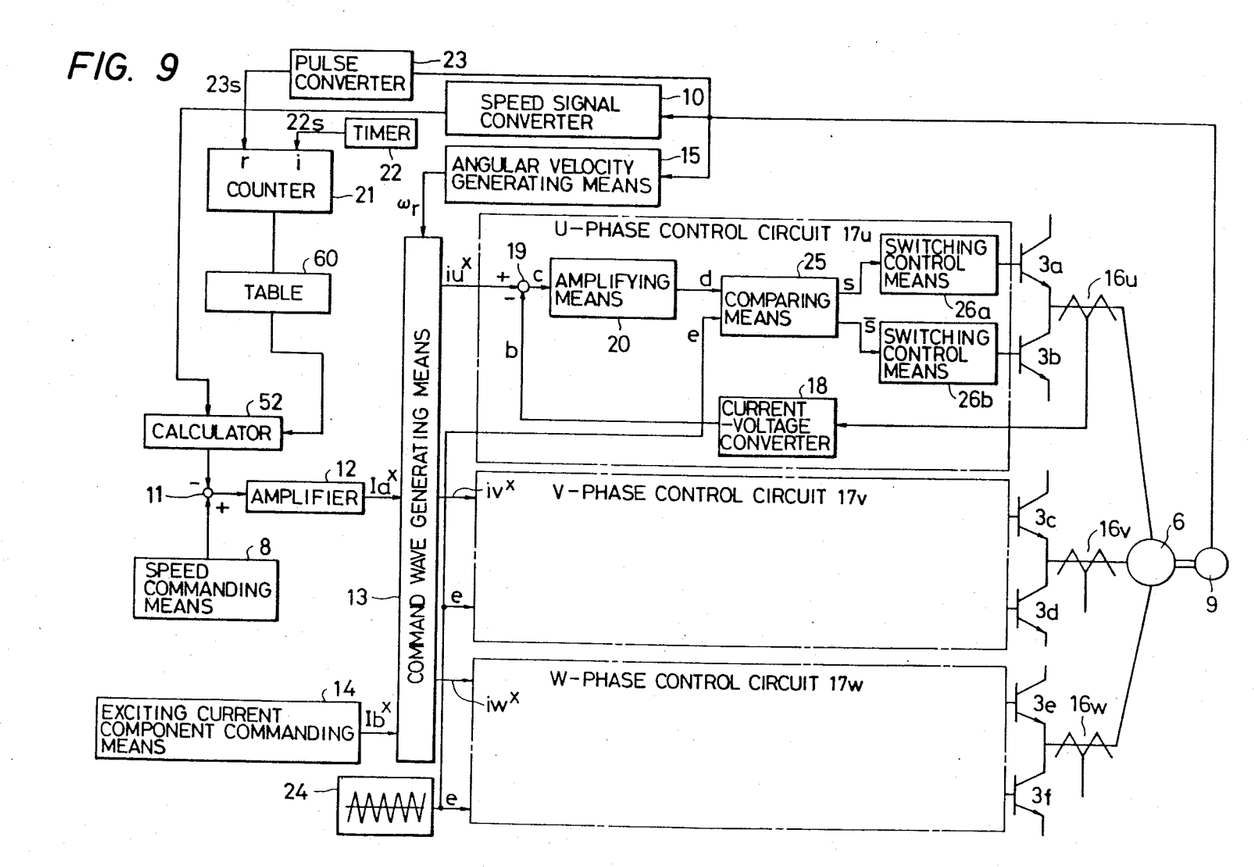
Figure 10:
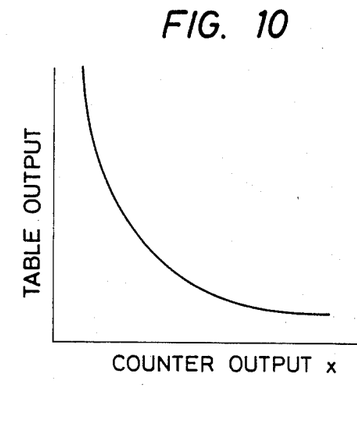

FIG. 9 is a different embodiment of the present invention. This embodiment is provided with table 60 that outputs an output of 1/x in response to the output x from counter 21 as shown in FIG. 10. In this case, as counter 21 uses an up-counter, calculator 52 uses a device having a division function.

Figure 11:
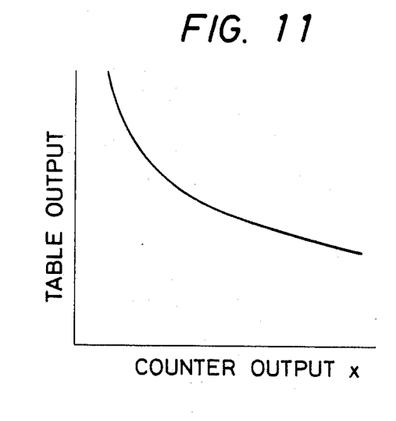

Table 60 may also use a device that has a characteristic shown if FIG. 10 and that issues as outputs of $1/\sqrt{x}$ as shown in FIG. 11. Further, devices that issue an output of $1/x^2$ and $1/x^n$, respectively, may also be used (or represents a positive number).

Figure 12:
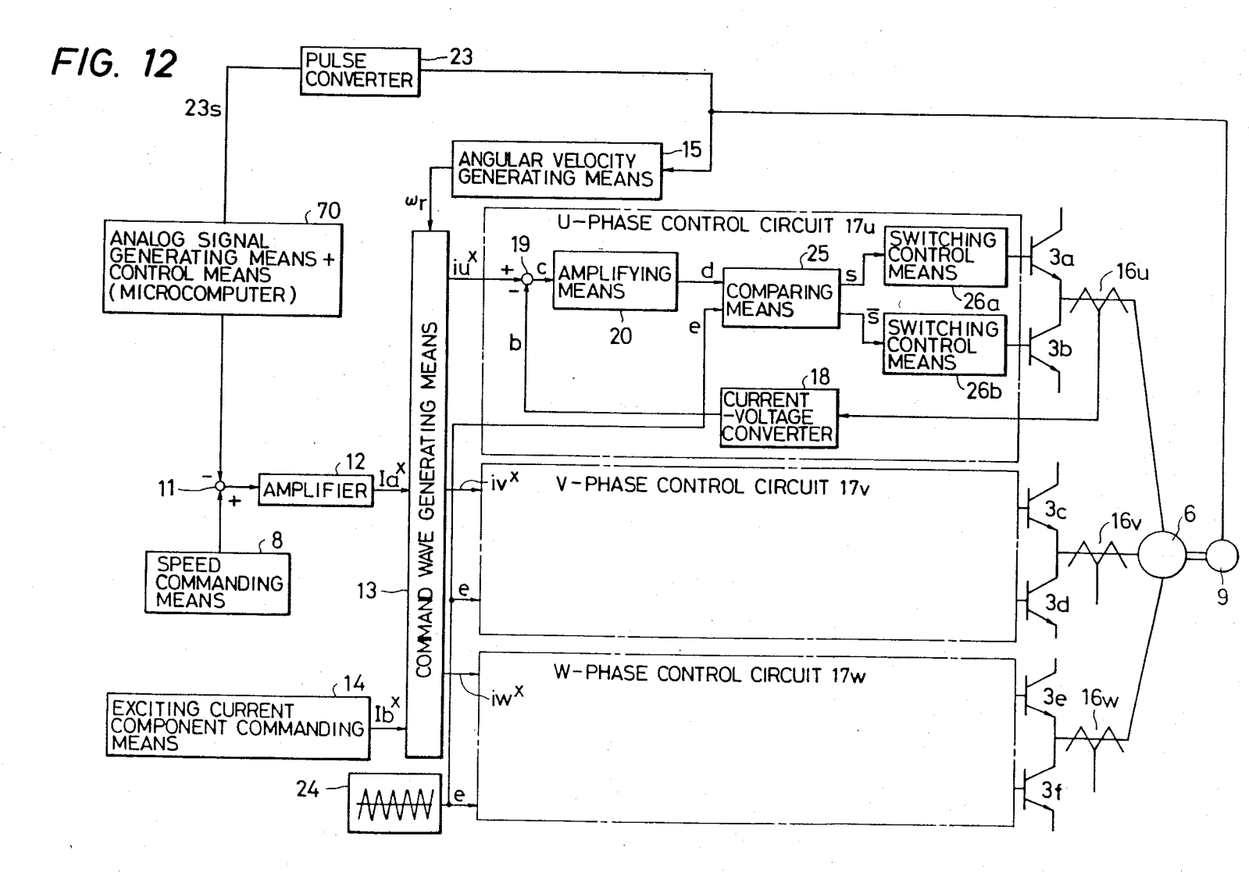

FIG. 12 is also another different embodiment of the present invention. In this embodiment, analog signal generating section and control circuit are realized by a microcomputer as represented with reference numeral 70. Microcomputer 70 is equipped with a program incorporated so as to act as the flow chart in FIG. 13 shows when receiving the output from pulse converter 23.

Figure 13:
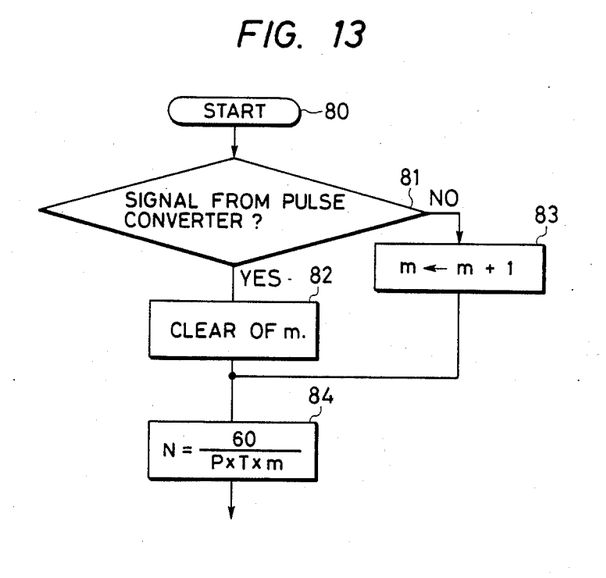
FIG. 13 is a flow chart used to explain the operation of the microcomputer for the embodiment shown in FIG. 12.

That is, block 80 in the flow chart in FIG. 13 is the start of the flow chart. First, the flow chart synchronizes with the timer incorporated into the microcomputer and block 81 in the flow chart judges whether or a signal is issued from pulse converter 23 in the interval between the preceding sampling and the present sampling. If the signal from pulse converter 23 is detected, control moves directly to block 82 and clears value m stored in the microcomputer. Otherwise, control moves to block 83 and adds 1 to value m so far stored in the microcomputer. After block 82 or 83 is executed, control moves to block 84, where the following calculation is executed and the resultant value of the N is output as feedback signal to the subtract circuit 11.

$$N = \frac{60}{P \times T \times X_m} \quad (8)$$

Here, P is the number of output pulses from the pulse converter per revolution of induction motor, and T the interval between the pulse signal preceding to the preceding pulse signal and the preceding pulse signal issued from pulse converter 23.

While a number of preferred embodiment have been described, the invention is not limited to these applications but can aply to various modified embodiment.

For example, while the present invention was described in preceding embodiments using an induction motor, it can also apply to embodiments using either as synchronous motor or a DC motor.

We claim:

1. A load driving apparatus comprising:
   an electric motor for driving a load;
   pulse generating means for generating pulses having a frequency corresponding to the revolution speed of the electric motor;
   analog signal generating means for providing an analog signal corresponding to the frequency of the output pulses of the pulse generating means;
   speed commanding means for providing a speed command signal commanding the revolution speed of the electric motor;
   energizing means for receiving a difference signal corresponding to the difference between the output analog signal of the analog signal generating means and the speed command signal of the speed commanding means and for energizing the electric motor so that the revolution speed of the electric motor is regulated in accordance with the difference signal; and
   control means for controlling the energizing means so that the magnitude of the output signal of the energizing means increases gradually in a period between two successive output pulses of the pulse generating means when the electric motor is operated at a low revolution speed.

2. A load driving apparatus according to claim 1, wherein the pulse generating means provides output pulses at a low frequency when the revolution speed of the electric motor is low.

3. A load driving apparatus according to claim 1, wherein the control means is responsive to the output analog signal of the analog signal generating means for gradually decreasing the magnitude of the analog signal of the analog signal generating means in a period between the two successive output pulses of the pulse generating means when the electric motor is operated at a low revolution speed so as to gradually increase the magnitude of the output signal of the energizing means.

4. A load driving apparatus according to claim 1, wherein the control means is responsive to the speed signal fo the speed commanding means for gradually increasing the magnitude of the speed command signal of the speed commanding means in a period between the two successive output pulses of the pulse generating means in a period between the two successive output pulses of the pulse generating means when the electric motor is operated at a low revolution speed so as to gradually increase the magnitude of the output signal of the energizing means.

5. A load driving apparatus according to claim 1, wherein the control means includes timing means for providing successive signals at predetermined time intervals, the control means being responsive to the pulse generating means failing to provide a pusle in a period between two successive signals of the timing means for controlling the energizing means so as to vary the output signal of the energizing means discontinuously.

6. A load driving apparatus according to claim 1, wherein the control means directly controls the speed commanding means to gradually increase the magnitude of the speed command signal of the speed commanding means in a period between the two successive output pulses of the pulse generating means when the electric motor is operated at a low revolution speed so as to gradually increase the magnitude of the output signal of the energizing means.

7. A load driving apparatus comprising:
   an electric motor for driving a load;
   analog signal generating means for providing an analog signal having a magnitude proportional to the revolution speed of the electric motor;
   speed commanding means for providing a speed command signal for commanding the revolution speed of the electric motor;
   energizing means for receiving a difference signal corresponding to the difference between the analog sigal of the analog signal generating means and the speed command signal of the speed commanding means and for energizing the electric motor so that the revolution speed of the electric motor is regulated in accordance with the difference signal;
   pulse generating means for generating pulses at a frequency corresponding to the revolution speed of the electric motor;
   pulse frequency detecting means for detecting when the frequency of the pulses generated by the pulse generating means becomes less than a predetermined value; and
   control means responsive to the pulse frequency detecting means for controlling one of the analog signal generating means and the speed commanding means to increase the magnitude of the difference signal in a period between two successive pulses of the pulses generated by the pulse generating means when the frequency is less than the predetermined value.

8. A load driving apparatus according to claim 7, wherein the control means is responsive to the pulse frequency detecting means for enabling the analog signal generating means to provide an analog signal having a magnitude corresponding to the frequency of pulses generated by the pulse generating means when the frequency of the pulses is greater than the predetermined value.

9. A load driving apparatus according to claim 8, wherein the control means is responsive to the analog signal of the analog signal generating means for gradually decreasing the magnitude of the analog signal of the analog signal generating means in a period between the two successive pulses when the frequency of the pulses generating by the pulse generating means is less than the predetermined value so as to gradually increase the difference signal.

10. A load driving apparatus according to claim 7, wherein the control means is responsive to the speed command signal of the speed commanding means for gradually increasing the speed commanding signal in a period between the two successive pulses when the frequency of the pulses generated by the pulse generating means is less than the predetermined value so as to gradually increase the magnitude of the difference signal.

11. A load driving apparatus according to claim 7, wherein the control means includes timer means for providing successive signals at predetermined time intervals, the control means being responsive to the pulse generating means failing to provide a pulse in a period between two successive signals of the timer means for varying the difference signal discontinuously.

12. A load driving apparatus according to claim 7, wherein the control means is responsive to the speed commanding means for directly controlling a gradual increase of the magntidue of the speed command signal of the speed commanding means in a period between the two successive pulses so as to increase the magnitude of the difference signal.

13. A load driving apparatus according to claim 7, wherein the analog signal generating means is responsive to the pulses generated by the pulse generating means for providing an analog signal corresponding to the revolution speed of the electric motor.

* * * * *